United States Patent [19]

Almqvist

[11] 4,090,556
[45] May 23, 1978

[54] MEANS FOR LOCATING PLATE ELEMENTS IN A DEVICE, SUCH AS A HEAT EXCHANGER, FILTER, OR THE LIKE

[76] Inventor: Christer Anders Hjalmar Almqvist, Faltspatsvagen 4, S-18340 Taby, Sweden

[21] Appl. No.: 684,542

[22] Filed: May 10, 1976

[51] Int. Cl.² .............................................. F28F 3/08
[52] U.S. Cl. ....................................... 165/78; 165/167
[58] Field of Search ....................... 165/78, 76, 80, 167

[56] References Cited

U.S. PATENT DOCUMENTS

| | | | |
|---|---|---|---|
| 1,972,379 | 9/1934 | Feldmeier | 165/78 |
| 2,252,916 | 8/1941 | Crosby | 165/78 |
| 2,314,966 | 3/1943 | Astle | 165/78 |
| 2,601,974 | 7/1952 | Hytte | 165/78 |
| 2,610,834 | 9/1952 | Dalzell | 165/78 |
| 2,621,028 | 12/1952 | Newhall | 165/167 |
| 2,754,093 | 7/1956 | Wennerberg | 165/78 |
| 3,448,796 | 6/1969 | Usher | 165/78 |

Primary Examiner—Charles J. Myhre
Assistant Examiner—Margaret A. La Tulip
Attorney, Agent, or Firm—Eric Y. Munson

[57] ABSTRACT

This invention relates to means for locating plate elements in a device, such as a heat exchanger, a filter, or the like for the purpose of making possible quick and easy interchange of such plate elements for cleaning or repairing them or for other purposes. The invention provides cut outs in the upper and lower portions of the elements which are confined by tongues which cooperate with cut outs in the vertical web portion of a carrying bar to enable the elements to be inserted in a pack of elements or removed from such a pack by simple twisting movements. The pack of plate elements is further guided by a lower guide bar, and the pack of plates and the bars may be fitted between two headers carried by a suitable frame.

2 Claims, 5 Drawing Figures

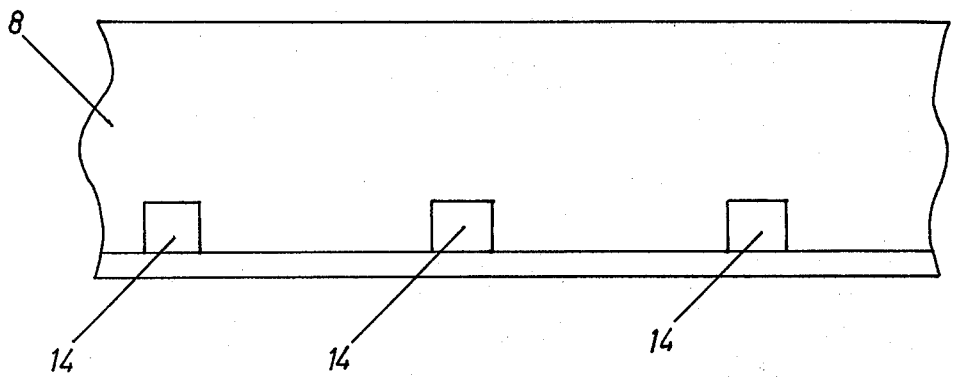
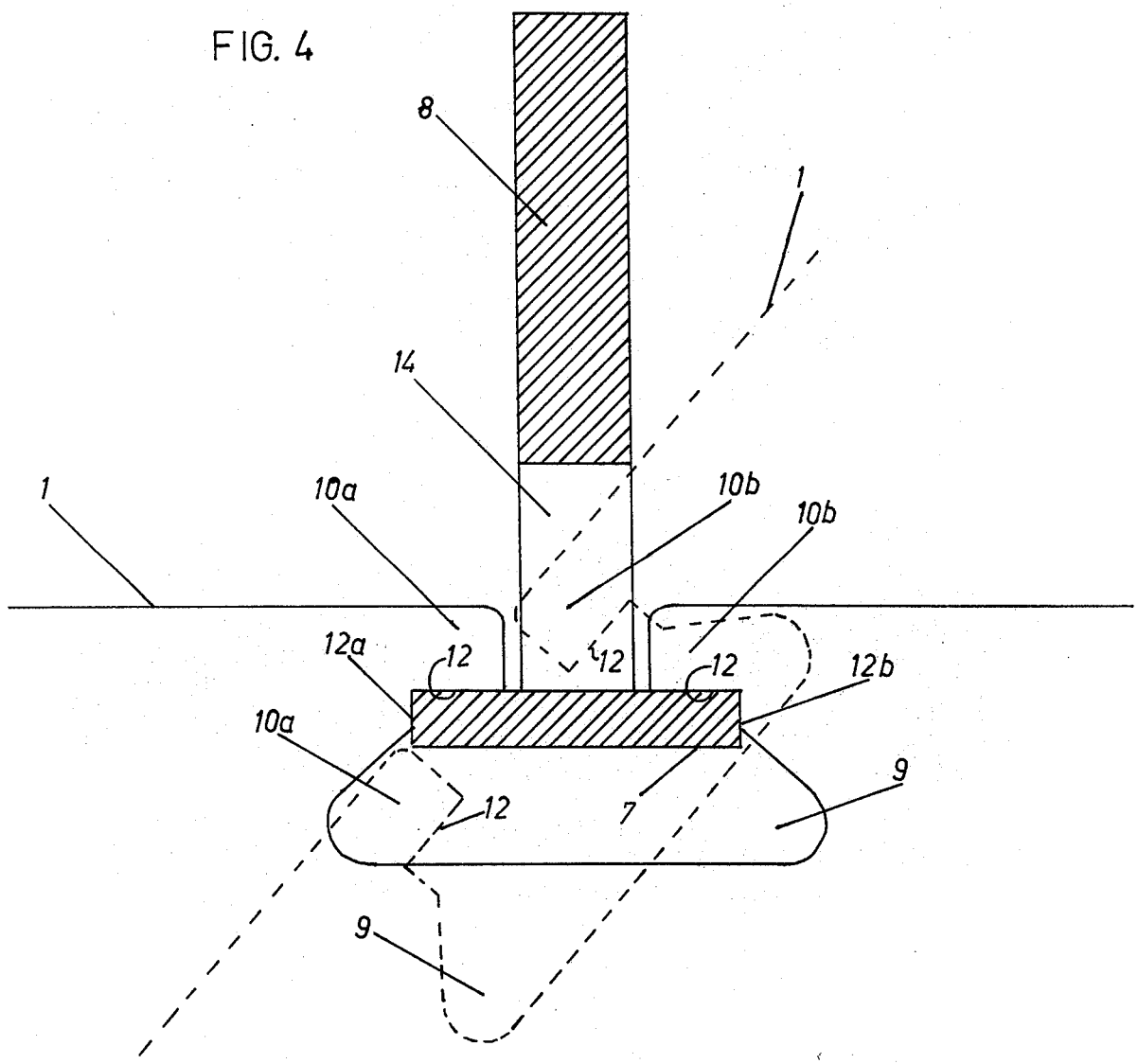

MEANS FOR LOCATING PLATE ELEMENTS IN A DEVICE, SUCH AS A HEAT EXCHANGER, FILTER, OR THE LIKE

SUMMARY OF THE INVENTION

The upper carrying bar is generally designed with a cross section of an I or an inverted T, on which the plate elements are hanging on the lower flanges of the section. To be able to hang and remove the plate elements easily to or from the bars respectively, the profile of the upper cut out in the plate element must be made considerably larger than the flange itself, and furthermore designed with a limited overlap on the flange, on which the oppositely directed tongues of the cut outs are resting, as the plate element can only be displaced or twisted up to the point where one of the tongues of the cut out lies close to the vertical web portion of the carrying bar. Even though the web portion is usually thin in relation to the width of the flange, it is normally necessary, due to lack of space, to make the surfaces of the flange, on which the tongues of the plate element rest, inclined or bevelled, and with a corresponding incline of the lower edges of the tongues. This brings the disadvantages, that on one hand the plate element in a plate package has the possibility to become displaced relatively to each other both upwards and sidewards, and on the other hand, the dimensions of the carrying bar becomes limited with respect to the desired requirement of mechanical strength of the carrying bar and the available area on the plate element for the profiled cut out.

SUMMARY OF THE INVENTION

The invention relates to means for locating the plate elements in a heat exchanger or a filter in an improved manner. The design is such that the upper carrying web portion of the bar section according to the invention is made such that the inwards pointing tongues of the profiled cut outs of the plate elements may at several positions along the upper carrying bar be twisted around the flange on which the plate elements rest, without being stopped by the web portion of the carrying bar, since the lower vertical part of the web portion is perforated, cut out or grooved. In this way, the inwards directed tongues may have considerably larger overlap on the flanges of the carrying bar than in known designs, permitting the tongues to be shaped so that a substantial improvement of locating the plate elements relatively to each other is acheived, both in sidewards and upward directions, and at the same time allowing a very easy hanging and removal of one single plate element in the heat exchanger or in the plate filter. This invention also increases the freedom of dimensioning the web portion of the carrying bar, which is of importance, since this web portion is the critical part to the mechanical strength of the carrying bar, and thus crucial for the number of plate elements to be placed in the heat exchanger or the filter.

BRIEF DESCRIPTION OF DRAWINGS

This invention will be further described with reference to accompanying drawings, which as examples illustrate two modifications of the invention, which can be altered in many ways within the scope of the claims of the patent. FIG. 3 illustrates a side view of a part of the upper carrying bar, FIG. 4 is a cross section of the carrying bar and the upper part of the plate shown in FIG. 2 in a larger scale illustrating in broken lines the position of the plate when twisted into position for dismantling.

DETAILED DESCRIPTION OF AN EMBODIMENT

Figure 1:
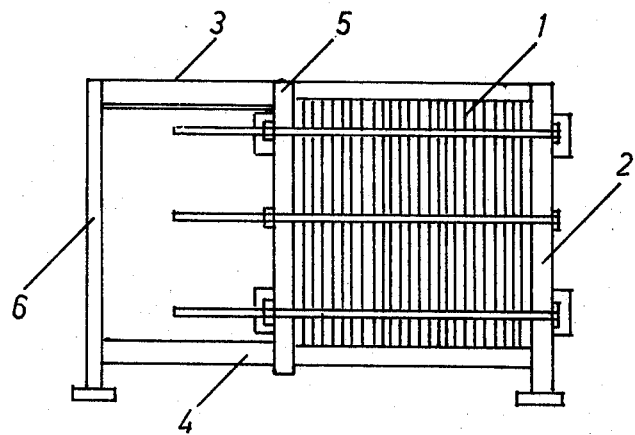
FIG. 1 is a side view of a heat exchanger or a filter of plate type.
Figure 2:
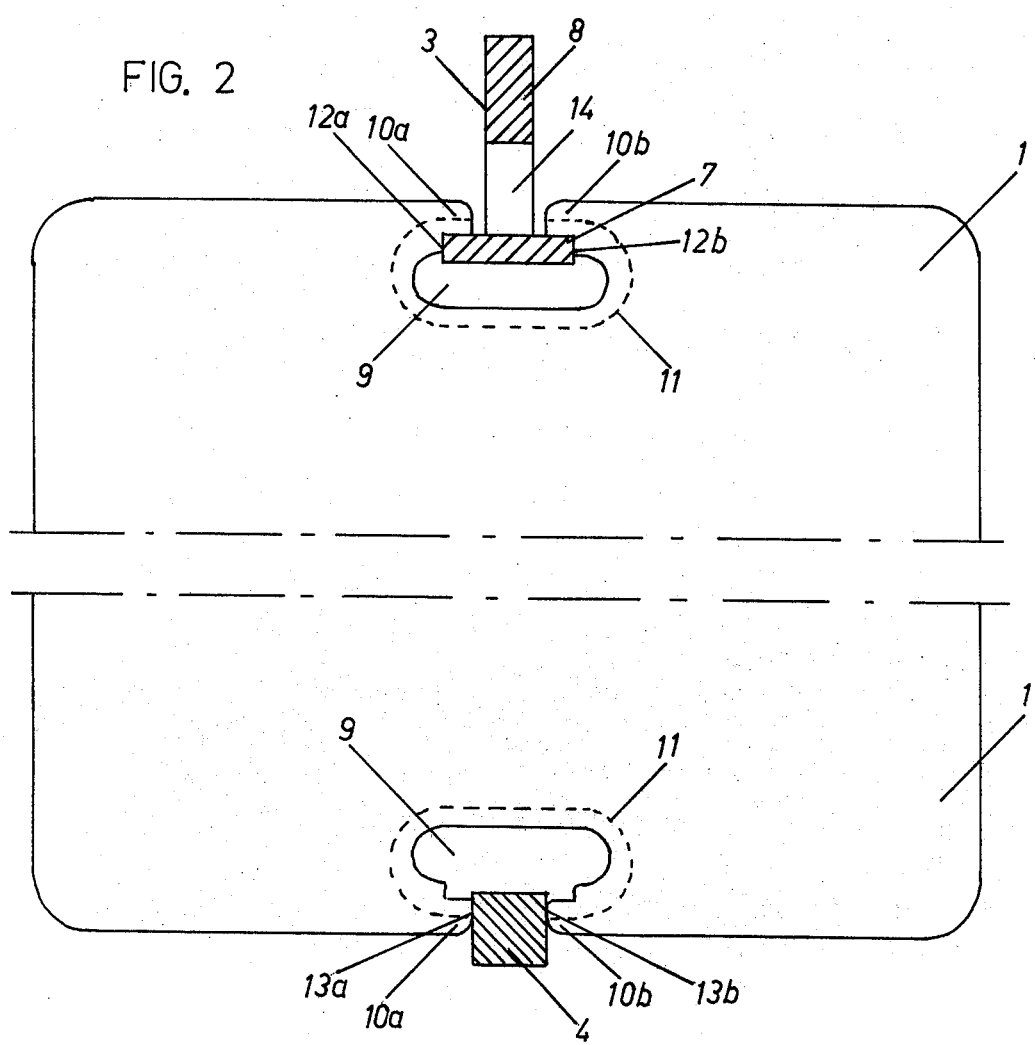
FIG. 2 is an enlarged cross section of FIG. 1.

The plate type device shown in FIG. 1 has a general form of a conventional design and includes plate elements 1 clamped to a plate package between a fixed frame or header 2 and a movable frame or header 5. The plate elements 1 are carried and guided by the bars 3 and 4, which are fitted both to the fixed frame 2 and to a supporting pillar 6. In one modification of the invention the top carrying bar 3 has an inverted T section with horizontal flanges 7 and a vertical web portion 8, as illustrated in FIG. 2. Each plate element has on its opposite edges identical, profiled cut-outs 9. These cut-outs have inwards, oppositely directed tongues 10a and 10b. The edge of the plate element is reinforced around the cut-outs 9, as indicated by the dotted lines 11. The plate elements are carried on the upper carrying bar by the tongues of the cut-outs of the plate element resting on the flange 7. Furthermore, the cut-out of the plate element is profiled such that support is obtained against the vertical surfaces of the flange, 12a and 12b. At the lower guiding bar the supporting surfaces, 13a and 13b, are made up by the tongues 10a and 10b and the vertical surfaces of the guiding bar 4. These supporting points give the plate elements fixed location both sidewards and upwards and effectively prevent against relative movements between different plate elements in a plate package.

Figure 5:
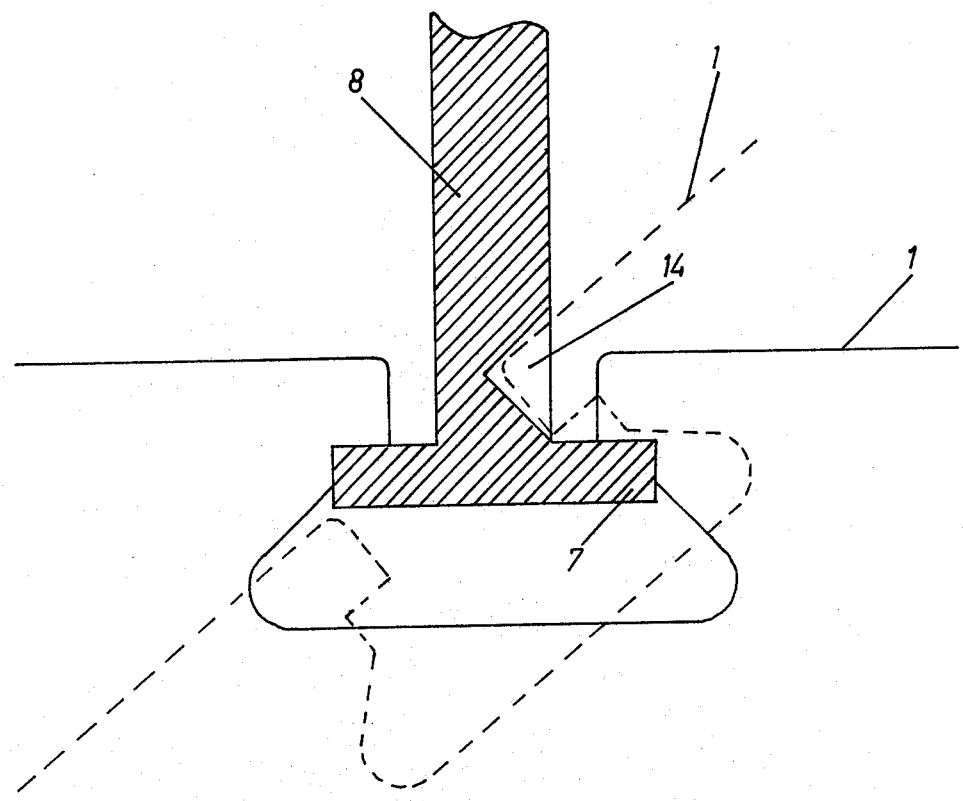
FIG. 5 is a similar section of alternative design of the carrying bar and the plate element according to the invention.

In FIG. 2 it is shown that the web portion 8 of the upper carying bar 3 is perforated, and in FIG. 3, where a portion of said carrying bar is reproduced in side view, it is shown that the perforations or gaps 14 are distributed along the carrying bar. In FIG. 4 the upper part of FIG. 2 is shown in a larger scale. The plate element in FIG. 4 is in position in the web portion of the carrying bar, and the cut-out 14 in the web portion provides free space for one of the tongues 10b of the cut-out when twisting the plate element in its own plane around the flange 7, and thereby resulting in a simple removal and insertion of individual plate elements in the plate device. In an alternative design, as illustrated in FIG. 5, only a portion of the web portion 8 has been cut out. The grooves 14 can be placed on both sides along the upper carrying bar to allow placing and displacing of plate elements from any side of the plate device.

When removing plate elements out of the plate device the following procedure takes place. The tightening device is loosened thereby making the movable frame 5 free. The movable frame 5 is then passed away from the plate package along the bars towards the supporting pillar 6. The plate elements 1 are pushed along the bars 3,4, and the plate element to be removed is placed at one of the perforations or gaps 14 in the web portion of the upper carrying bar, and space is provided against adjacent plates, such that the plate element can be inclined at right angles to the plane of the plate element by moving the bottom edge of the plate element alongside the lower guiding bar 4. Hereby, the plate element gets clear from the lower bar, and can from the inclined position be twisted in its own plane about the flange of the upper carrying bar. The twisting about the flange is accomplished by moving one of the tongues 10a, 10b of the cut-out in direction towards the web portion of the carrying bar 3. By means of the gaps or grooves in the web portion 8 of the bar the tongues 10b of the cut-outs can be moved inwards far over the flange 7, permitting the other tongue 10a of the cut-out to pass the other flange 7 of the carrying bar. In FIGS. 4 and 5 the plate element has been drawn with dotted lines to show the position where the tongues of the cut-out get clear around the flange and from where the plate element can be removed by bringing the plate element at right angle from the upper carrying bar.

The above described means for locating plate elements by the arranged supporting surfaces keeps the plate elements in exact position in the plate device and relative to each other, and at the same time allows the plate elements to be easily placed in and removed from the plate device. The cut-outs, perforations or grooves 14 in the top carrying bar may naturally have different designs within the scope of the invention as described in the following claims.

What I claim is:

1. In a structure supporting an assembly of plate elements, such as heat exchange plates and the like, in which the tops of the plates are suspended from an inverted T-shaped top bar having a vertical web portion (8) and transverse flanges (7) for slidably engaging oppositely directed tongues (10a, 10b) of a profiled cut-out in the plates to suspend the latter on the top bar, the bottoms of the plates being provided with cut-outs engaging a bottom guide bar (4) to hold the suspended plates in position to permit the bottoms thereof to be swung laterally into an inclined, disengaged position; the improvement providing for easy and rapid assembly and removal of the plates comprising:

(a) a plurality of spaced gaps (14) in said web portion (8) located above said flanges (7) which extend continuously along the web portion;

(b) said gaps and said cut-outs (9) being profiled so as to allow the plate elements to be twisted about their plane to disengage said tongues (10a, 10b) from said flanges (7) when the top of the plate elements has been slid into a position facing the gaps and to be withdrawn from the top bar when the bottom of the plate elements has been disengaged from the bottom guidebar.

2. A structure according to claim 1, in which the tongues (10a, 10b) are provided with under-cuts (12a, 12b) which engage the lateral edges of the flanges when the plate elements rest thereon.

* * * * *